C. J. HOLSLAG.
ARC WELDING SYSTEM.
APPLICATION FILED SEPT. 2, 1920.
1,408,805.
Patented Mar. 7, 1922.
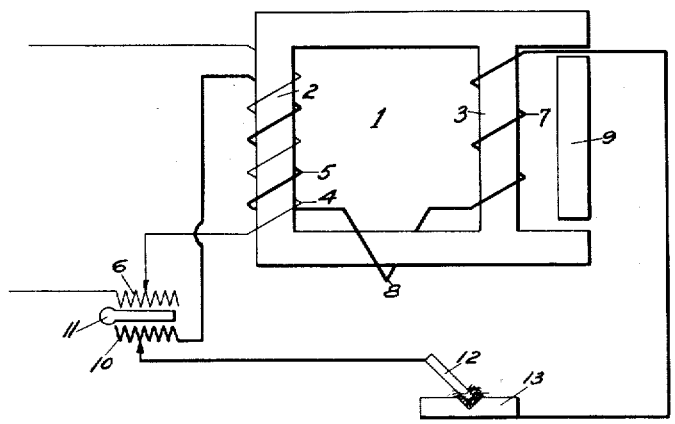
INVENTOR
Claude J. Holslag
BY
Albion D. T. Libby
ATTORNEY

UNITED STATES PATENT OFFICE.

CLAUDE J. HOLSLAG, OF SOUTH ORANGE, NEW JERSEY.

ARC-WELDING SYSTEM.

1,408,805.   Specification of Letters Patent.   Patented Mar. 7, 1922.

Application filed September 2, 1920. Serial No. 407,776.

*To all whom it may concern:*

Be it known that I, CLAUDE J. HOLSLAG, a citizen of the United States, residing at South Orange, in the county of Essex, State of New Jersey, have invented certain new and useful Improvements in Arc-Welding Systems, of which the following is a description, reference being had to the accompanying drawing and to the figures of reference marked thereon.

My invention relates to arc welding systems, particularly a system wherein alternating current is not only the source of power, but in which alternating current is used at the welding arc.

It has been found that an alternating current system which utilizes alternating current at the welding arc, possesses many advantages over the direct current arc and in certain classes of work it is desirable to have a voltage, at the instant of starting the arc, considerably higher than the voltage required to maintain the arc after it has been started, but in some cases it is desirable to reduce this open circuit voltage previous to striking the arc, so that the operator will not get any serious shocks should he accidentally come in contact with the exposed electrodes.

It is the object of my invention, therefore, to provide an alternating current welding system in which the open circuit voltage across the electrodes is reduced to a safe value, and which automatically adjusts itself to the conditions of the welding operations, whereby all the advantages and results of a high initial voltage are obtained without the objection of having the higher open circuit voltage applied to the electrodes.

Another object of my invention is to simplify such a system so as to obtain the results desired in a cheap but effective manner.

Other and further objects will be apparent to one skilled in the art after a study of the specification and drawing annexed thereto.

In carrying out my invention, I have chosen to illustrate the same in connection with a well-known type of alternating current transformer of the Holslag type.

In the accompanying drawing which embodies one form of my invention, 1 is a transformer having two limbs 2 and 3, about the limb 2 of which is wound a primary winding 4 and a secondary winding 5. The primary winding is connected to a suitable source of alternating current through a variable impedance coil 6. The secondary winding has an auxiliary portion 7 in series with the main portion wound to oppose or assist the main portion as is desired, and an intermediate portion 8 is wound about one of the core bridging members to steady the operation of the transformer. A flux diverter 9 is movably arranged in shunt relation to the core 3 so as to vary the effective flux through the core 3.

Connected in series with the secondary circuit is a variable impedance coil 10 wound in opposition to the impedance coil 6 either on the same core 11 or in magnetic linkage relation therewith and interposed in this secondary circuit are the two electrodes 12 and 13 of the welding machine, it being understood that the electrode 13 may be the work to be welded.

Normally, with the welding circuit open at 12, 13, the impedance of the coil 6 reduces the voltage across the terminals of the transformer primary so that the voltage at the terminals of the secondary circuit is reduced. Upon the establishment of a closed circuit in the secondary, the impedance coil 10 establishes a flux tending to neutralize the action of the coil 6 and the voltage across the transformer primary rises until a balance is established between the fluxes of the two primary coils, allowing the voltage across the arc to be established in accordance with the normal functioning of the transformer.

Having thus described my invention, what I claim is:

1. An arc welding system comprising a transformer having primary and secondary windings, a plurality of electrodes connected to the secondary winding, and electrical devices, having no moving parts connected in series with the primary and secondary windings, said devices maintaining a low open circuit voltage between the electrodes but permitting an increased voltage to be established across the arc in accordance with the normal functioning of the transformer.

2. An arc welding system comprising a transformer having primary and secondary windings, a plurality of electrodes connected to the secondary winding, an impedance connected in series with the primary winding and a second impedance tending to neutralize the effect of the impedance when current flows in said first welding circuit including said secondary winding.

3. An arc welding system comprising a transformer having primary and secondary windings, a plurality of electrodes connected to the secondary winding, an impedance connected in series with the primary winding and means including an impedance connected in the secondary circuit but electrically associating with the first impedance tending to neutralize its effect when current flows between said electrodes.

4. An arc welding system comprising a transformer having primary and secondary windings, a plurality of electrodes connected to the secondary winding, an impedance connected in series with the primary winding, a second impedance connected in the secondary circuit with said electrodes but associated with the first impedance in such a way as to neutralize its effect during the welding operation.

5. An arc welding system comprising a transformer having primary and secondary windings, a plurality of electrodes connected to the secondary winding, a pair of windings associated with a common core, one of said windings being in the primary circuit and the other in the secondary circuit, said windings being so disposed with reference to the core and to each other that the impedance of one neutralizes the impedance of the other.

6. An arc welding system comprising a transformer having primary and secondary windings, a plurality of electrodes connected to the secondary windings, means for automatically increasing the voltage between the electrodes during the period of establishing an arc and means for establishing a low open-circuit voltage between the electrodes, said means including an impedance device connected in series with the primary winding, and means including an impedance device in the secondary circuit for neutralizing the effect of the first impedance device on establishing the arc.

7. An arc welding system comprising a transformer having primary and secondary windings, a plurality of electrodes connected to the secondary winding, means for automatically increasing the electrical energy available at the electrodes during the period of establishing an arc, and means for maintaining a low open-circuit voltage between the electrodes, said means including an impedance device connected in series with both the primary and secondary windings.

8. An arc welding system comprising a transformer having primary and secondary windings, a plurality of electrodes connected to the secondary winding, means for automatically increasing the electrical energy available at the electrodes during the period of establishing an arc, and means for maintaining a low open-circuit voltage between the electrodes, said means including a compound impedance device having a part in both the primary and secondary circuits but tending to neutralize each other when the arc is established.

In testimony whereof, I affix my signature.

CLAUDE J. HOLSLAG.

Certificate of Correction.

It is hereby certified that in Letters Patent No. 1,408,805, granted March 7, 1922, upon the application of Claude J. Holslag, of South Orange, New Jersey, for an improvement in "Arc-Welding Systems," errors appear in the printed specification requiring correction as follows: Page 2, line 1, claim 2, for the article "the", second occurrence, read *said first*, and line 2, for the words "said first" read *the;* and that the said Letters Patent should be read with these corrections therein that the same may conform to the record of the case in the Patent Office.

Signed and sealed this 17th day of April, A. D., 1922.

[SEAL.]
KARL FENNING,
*Acting Commissioner of Patents.*